US009440761B2

(12) United States Patent
Villaret De Chauvigny et al.

(10) Patent No.: US 9,440,761 B2
(45) Date of Patent: Sep. 13, 2016

(54) PROCESS AND EQUIPMENT FOR THE FABRICATION OF GLASS CONTAINERS WITH INTERNALLY THREADED NECK

(75) Inventors: Benoit Villaret De Chauvigny, Sinte Foy les Lyon (FR); Gino Giovanni Brignolo, Trezzano sul Naviglio (IT); Ambrogio Morettin, Cinto Caomaggiore (IT); Federico Campodonico, Genoa (IT); Dalmazio Perrone, Asti (IT)

(73) Assignee: Owens-Brockway Glass Container Inc., Perrysburg, OH (US)

( * ) Notice: Subject to any disclaimer, the term of this patent is extended or adjusted under 35 U.S.C. 154(b) by 602 days.

(21) Appl. No.: 13/701,289

(22) PCT Filed: May 30, 2011

(86) PCT No.: PCT/EP2011/002659
§ 371 (c)(1),
(2), (4) Date: Jun. 28, 2013

(87) PCT Pub. No.: WO2011/151047
PCT Pub. Date: Dec. 8, 2011

(65) Prior Publication Data
US 2013/0299444 A1 Nov. 14, 2013

(30) Foreign Application Priority Data

May 31, 2010 (FR) ...................................... 10 54201
Jun. 16, 2010 (IT) .............................. MI2010A1085

(51) Int. Cl.
C03B 9/193 (2006.01)
B65D 1/02 (2006.01)
B65D 39/08 (2006.01)

(52) U.S. Cl.
CPC ........... *B65D 1/0246* (2013.01); *B65D 1/0207* (2013.01); *B65D 39/08* (2013.01); *C03B 9/1932* (2013.01)

(58) Field of Classification Search
CPC .................................................... C03B 9/325
See application file for complete search history.

(56) References Cited

U.S. PATENT DOCUMENTS

| 13,402 A | 8/1855 | Stone |
| 30,106 A | 9/1860 | Focer |

(Continued)

FOREIGN PATENT DOCUMENTS

| DE | 183525 | 4/1907 |
| DE | 321345 | 5/1920 |

(Continued)

OTHER PUBLICATIONS

Engish language translation of FR 0027780.*

(Continued)

*Primary Examiner* — Jason L Lazorcik

(57) ABSTRACT

The present invention relates to a process and equipment for the fabrication of glass containers with internally threaded neck and such containers. The plunger (6) is from the glass leaving an imprint corresponding to the mouth (M) of a bottle, wherein the plunger has at least one helical groove (15) in its outside surface. During the extraction, the plunger is rotated around a longitudinal axis (X-X) performing a roto-translational motion to unscrew the plunger out of the partially solidified glass, leaving an internal thread in the mouth (M) of the bottle. The roto-translational motion for the extraction of the plunger is generated by: a linear actuator (30) acting on the plunger (6), thereby effecting a linear movement of the plunger (6) along said longitudinal axis (X-X), a guide body (14) wherein the plunger (6) is moved relative to the guide body (14) along said longitudinal axis (X-X), and a helical guide (16, 17) coaxial to the longitudinal axis (X-X) and being provided between said guide body (14) and said plunger (6) and transforming said linear movement effected by said linear actuator (30) on said plunger (6) into said roto-translational motion of said plunger (6).

20 Claims, 5 Drawing Sheets

(56) References Cited

U.S. PATENT DOCUMENTS

| | | | |
|---|---|---|---|
| 130,208 A | 8/1872 | Frank | |
| 480,774 A | 8/1892 | Leng | |
| 509,214 A | 11/1893 | Friedrich | |
| 509,525 A | 11/1893 | Gray | |
| 606,200 A | 6/1898 | Friedrich | |
| 36,781 A | 2/1904 | Blower | |
| 767,515 A | 8/1904 | Forster | |
| 1,406,722 A * | 2/1922 | Brown | 65/229 |
| 1,453,759 A * | 5/1923 | Glaspey | 65/229 |
| 1,502,560 A * | 7/1924 | Glaspey | 65/232 |
| 1,560,158 A * | 11/1925 | Glaspey | 65/218 |
| 1,560,159 A * | 11/1925 | Glaspey | 65/232 |
| 1,695,894 A * | 12/1928 | Glaspey | 65/207 |
| 2,026,304 A | 12/1935 | Deady | |
| 2,215,984 A * | 9/1940 | Soubier | 65/210 |
| 2,609,955 A | 9/1952 | Moore | |
| 5,947,310 A | 9/1999 | Wagner | |
| 6,102,225 A | 8/2000 | Lynn | |
| 6,216,897 B1 | 4/2001 | Wagner | |
| 2001/0052508 A1 | 12/2001 | Wagner | |
| 2003/0057173 A1 | 3/2003 | Wagner | |
| 2007/0125720 A1 | 6/2007 | Stecca | |
| 2010/0264107 A1 * | 10/2010 | Lonsway et al. | 215/40 |
| 2010/0270260 A1 | 10/2010 | Jung | |
| 2011/0290756 A1 * | 12/2011 | Horstman | B65D 39/08 215/329 |

FOREIGN PATENT DOCUMENTS

| | | |
|---|---|---|
| DE | 4236245 | 5/1994 |
| EP | 0027780 | 1/1985 |
| EP | 0225293 | 6/1987 |
| EP | 0667300 | 6/1999 |
| FR | 331.391 | 4/1903 |
| FR | 1.246.454 | 10/1960 |
| FR | 2881421 | 8/2006 |
| GB | 132589 | 9/1919 |
| JP | 62-003028 | 1/1987 |
| JP | 2001-322161 | 11/2001 |
| KR | 20-0255577 | 12/2001 |
| WO | WO 2011/151047 A2 | 12/2011 |

OTHER PUBLICATIONS

English language translation of DE 183525.*
PCT Written Opinion of the International Searching Authority Date: Not Given App No. PCT/EP2011/002659 Filing Date: May 30, 2011.

* cited by examiner

PROCESS AND EQUIPMENT FOR THE FABRICATION OF GLASS CONTAINERS WITH INTERNALLY THREADED NECK

FIELD OF THE INVENTION

The present invention relates to a process and equipment for the fabrication of glass containers, particularly bottles, provided with an internally threaded neck and to such a glass container. In particular, the present invention relates to a process and equipment suitable for making wine or spirit bottles with a thread located on an internal surface of the neck of the container and suitable for reversible engaging/disengaging a compressible stopper by screwing/unscrewing.

BACKGROUND AND SUMMARY OF THE DISCLOSURE

It is known for many decades to plug wine and spirit bottles by means of a cylindrical cork stopper which is pressed in the neck of the bottle with a certain compression rate. Although this technique has been used exclusively for a very long time, in recent years the cork stopper was called into question again for various reasons linked mainly to the cost and the quality of the stored wine, in particular the development of the so-called "cork" taste.

Compressible stoppers made of synthetic material were developed as replacements for wine bottle cork stoppers and are being used more and more. These compressible synthetic stoppers are considered neutral relative to the bottled wine, and their cost is easier kept under control than that of cork stoppers. However, they have the disadvantage of having low or no recyclability and are not always being easy to extract. These synthetic stoppers also may evoke an image with consumers of industrial production and low quality.

It is also known that wine bottles can be plugged with screw caps. This plugging technique can be well controlled and the preservation performance is considered similar to that of cork or synthetic stoppers. Furthermore, screw caps are recyclable, at least in theory, after separating the internal liner from the cap. However, especially in Europe, this plugging technique may still be considered reserved for low range wines and wines from the so-called New World.

Bottles provided with internal thread have been known for a long time. Such type of bottle is described, for instance in documents U.S. Pat. No. 2,026,304, FR1170472, U.S. Pat. No. 516,726, U.S. Pat. No. 868,914, U.S. Pat. No. 173,089, U.S. Pat. No. 482,682, U.S. Pat. No. 52,269 and EP0027780.

EP1501738 describes a method for making a ceramic bottle provided with an internally threaded neck. The method consists of the following phases: mating a threaded tube with the lower extremity of a funnel shaped body; positioning the threaded tube and the funnel shaped body on the upper extremity of a two part model and injecting the ceramic material through the body in the model; discharging the excess material by turning the model upside down; separating the body from the model leaving the threaded tube in the neck of the bottle; reducing the threaded tube to ash in order to release the thread.

Automated processes are also known today for the production of glass containers. For instance, in the so-called "blow-and-blow" process, gobs of molten glass are fed in chambers of respective blank molds each provided, in a lower part, with a plunger, movable in vertical direction between a lowered and raised position. Just before the gob enters the mold, the plunger is raised and forms an imprint in the glass surrounding the plunger. The plunger is lowered leaving the imprint in the gob and subsequently, air is blown through the imprint to form from the gob into a tubular body, closed at the upper extremity and known in the technical field as a "parison". The parison is then transferred to a final blow mold in which it is suspended by the neck. Air is again blown in the parison, which inflates filling the whole cavity of the final blow mold, assuming the final form of the bottle.

At a first glance, producing a glass container with internal threaded neck may appear to be simple. In practice, this is not the case, in particular when it comes to industrial production at controlled costs. In fact, it is difficult to produce such containers with threaded neck with a controlled, reproducible and robust process, which is easily transferred from one plant to another or from one production line to another. Furthermore, the production speed of existing machines should be maintained, while controlling the quality produced in the production lines to avoid any glass debris.

JP 62-003028 describes an apparatus for producing an inside screw bottle. A screw is formed on the inner surface of the bottom of the gob by the part of the plunger. The plunger is then lowered under rotation and the counter-blow operation is carried out.

U.S. Pat. No. 1,502,560 describes a machine for making bottles, or similar containers, which are provided within the mouth-portion with an internal screw thread. It uses a mandrel or plunger associated with each mold having a tip portion being provided with a thread which serves to form a thread within the mouth of the bottle.

Other manufacturing processes mainly proposed in the first half of the 19$^{th}$ century are described in GB 132,589, U.S. Pat. No. 2,215,984, DE 183525, U.S. Pat. No. 1,406,722, FR 697,986, U.S. Pat. No. 1,560,158, BE 488693.

However the equipment described therein uses complicated mechanisms to generate a rotational movement of a screwed tap which seem to be prone to failure and need a lot of space making it difficult to be used with today's manufacturing equipment. Furthermore, the parison forming operation as shown therein is time-consuming and may slow down the production speed. Moreover, those methods imprint a single thread with small pitch and several turns in the container, making the container unergonomic and cumbersome to open and to close for the user.

Therefore, it is an object of the present invention to provide a fast and efficient process for the fabrication of glass bottles with an internally threaded neck.

Another object of the present invention is to provide a structurally simple and reliable equipment for the fabrication of glass bottles with an internally threaded neck, which can be used within existing glass container manufacturing machines with minimum change of the existing equipment.

A further object of the invention is to provide a glass container which can be produced with the method and/or equipment of the present invention, specifically a bottle for holding wine and/or spirits, with an internally threaded neck which can be opened and closed quickly and ergonomically while still providing good sealing capabilities.

The objects of the invention are achieved by subject matter of the independent claims. Preferred embodiments are defined in the dependent claims.

According to a first aspect, the present invention relates to a process for the fabrication of glass containers, preferably bottles, provided with an internally threaded neck/mouth comprising the steps of: a) feeding a gob of molten glass inside the chamber of a first mold equipped with a tap or plunger having at least one helical rib or groove on its outside surface; b) extracting the plunger from the partially solidified glass by a roto-translational motion, wherein said plunger is rotated around a longitudinal axis coaxial to the outside surface with said at least one helical rib or groove while being longitudinally extracted, in order to unscrew the plunger from the partially solidified glass, leaving a threaded imprint in the glass portion corresponding to the mouth of the container to be produced; c) blowing air into the mouth until the container is formed.

The roto-translational motion for the extraction of the plunger in step b) is generated as follows: A linear actuator acts on the plunger, thereby effecting a linear movement of the plunger along said longitudinal axis and relative to a guide body which is fixed relative to the first mold and surrounding the plunger in said step b). A helical guide being coaxial to the longitudinal axis is provided between said guide body and said plunger and directly transforms said linear movement effected by said linear actuator on said plunger into said roto-translational motion of said plunger. In the production process the gobs are fed in sequence in the chamber of the first mold and the phases a), b) and c) are repeated for every gob.

Advantageously this type of drive mechanism is simple, reliable and well suited to be used with already existing glass production machines, e.g. existing I.S. machines and requires only minimum adaptations of the existing machines. In particular a pneumatic or hydraulic piston drive or a servo-electric drive, being coaxial to the plunger can still be used. Using a helical guide coaxial to the plunger to transform the linear movement effected by the piston or servo-electric drive drive can advantageously be provided within the restricted space of such a machine.

Advantageously, the process is well suited for internal threads in the neck with specifically desired thread geometries. For imprinting such an internal thread in the container neck the at least one helical rib or groove winds around said longitudinal axis over a predefined angle and the plunger is rotated over an angle of rotation equal to or greater than said predefined angle in said roto-translational motion in step b), wherein the angle of plunger rotation is preferably smaller than 360°, more preferably smaller than 200° and according to a preferred embodiment only 90°+/−30°, allowing to maintain a high production speed.

Therewith, a high production speed can be maintained. Furthermore, this allows the production of a neck with an internal thread of coarse pitch and small angular extension around said longitudinal axis (azimuth angle), which can be advantageous for certain applications, e.g. for wine or spirit bottles.

Preferably, said guide body is realized as a thimble which engages the neck ring and longitudinally guides the plunger and the helical guide is provided between the thimble and the plunger. In said steps a) and b) the thimble is fixed relative to the first mold by engaging the neck ring and after extracting the plunger the thimble is moved away down out of engagement with the neck ring.

According to a preferred embodiment of the invention, the fabrication process is a blow-and-blow process, wherein
said first mold is a blank mold and in a step b1) after extracting the plunger the gob is blown to form a parison inside the chamber of said blank mold,
in a step b2) said parison is transferred from the blank mold in a chamber of a blow mold,
in step c) said parison is blown to form the container inside the chamber of the blow mold.

According to a second aspect, the present invention relates to equipment for the fabrication of glass containers provided with an internally threaded neck, comprising: a first mold delimiting an internal chamber; a plunger movable between a first position, in which it is located inside the chamber delimiting a volume, in negative, corresponding to the mouth of the container, and a second position, in which it is extracted from said chamber; a moving device operatively coupled to the plunger in order to move it from the first position to the second position. The plunger has at least one helical rib or groove on its outside surface and the movement between said first and second position is a roto-translational motion to unscrew the plunger from the glass portion corresponding to the mouth of the container to be produced. The roto-translational motion of the plunger when it is extracted from the imprint which corresponds to the mouth of the container to be produced allows to release the plunger off the mouth without damaging the internal thread formed in it. The roto-translational motion is generated with the following equipment:
a linear actuator which acts on the plunger, thereby effecting a linear movement of the plunger along said longitudinal axis between said first and second position;
a guide body being fixed relative to the first mold and surrounding the plunger, wherein the plunger is movable relative to the guide body along said longitudinal axis; and
a helical guide coaxial to the longitudinal axis and being provided between said guide body and said plunger wherein said helical guide directly transforms said linear movement effected by said linear actuator on said plunger into said roto-translational motion of said plunger between said first and second position. Again, this allows to maintain the production speed and to use the equipment in existing machines with minimum changes.

According to a preferred embodiment of the invention, the plunger has a work portion in the form of a mandrel extending in the neck ring of the first mold in step a) and a base located below the neck ring. Said at least one helical rib or groove forming said internal thread in the container neck is provided on the circumferential outside surface of the mandrel.

Preferably, the linear actuator comprises a pneumatic or hydraulic piston drive or a servo-electric drive and a driving rod, all being arranged coaxially with the plunger and the first mold. The driving rod is movable coaxially with said longitudinal axis and has a terminating head portion being longitudinally fixedly connected to the base of the plunger.

Preferably, the terminating head portion of the driving rod has an upper flange and the base of the plunger has a lower flange. The flanges of the terminating head portion and the base are engaged by a clamp, e.g. a split ring to connect the terminating head portion of the driving rod and the plunger base.

The flanges of the terminating head portion of the driving rod and the plunger base are slidingly engaged with each other to allow for relative rotation between the driving rod and the plunger base. Thus, the plunger may carry out the roto-translational motion, while the driving rod is purely linearly moving without rotational motion component. Therewith, the equipment can be simply retrofitted in existing machine constructions.

Preferably, said at least one helical rib or groove winds around said longitudinal axis over a predefined angle $\gamma_1$ (azimuth angle), which is preferably smaller than 360°, more preferably smaller than 200° and according to a preferred embodiment $\gamma_1=90°+/−30°$. The plunger is rotated over an angle of rotation equal to or greater than the predefined angle $\gamma_1$, but preferably not more than 360°.

This geometry allows for rapid disengagement of the plunger from the threaded mouth.

Preferably m helical ribs or grooves are provided on the plunger, wherein m is greater than or equal to two, thus forming a multi-turn thread with m independent thread turns. According to a preferred embodiment m is chosen between three and five, preferably is equal to four. The m ribs or grooves are preferably angularly staggered by an angle equal to 360° divided by m.

Furthermore, the helical guide has the same pitch angle as the at least one helical rib or groove on the outside of the plunger which imprints the internal thread in the glass portion corresponding to the mouth of the container to be produced.

Preferably, said at least one helical rib or groove has a pitch angle $\beta_1$ (angle between the at least one rib or groove and a plane perpendicular to the longitudinal axis) of between 30° and 50°. It has turned out that a particularly preferred pitch angle is $\beta_1=37°+/-5°$, allowing for a smooth transformation of the linear movement to the roto-translational motion on the one hand side. On the other hand side, these geometric characteristics result in a thread that guarantees secure engagement and tight holding of a cork stopper and, at the same time, easy and fast extraction of the plunger during the mass production phase of the containers.

As already indicated, the plunger has preferably a work portion or mandrel on which the at least one helical rib or groove forming said internal thread in the container neck is provided and a base for connecting with the plunger rod. According to a preferred embodiment of the container to be produced the mandrel has a thread-free ring below the ribs or grooves on its outside surface to form a thread-free portion of the container mouth adjacent to the finish of the container. This can be advantageous in view of the sealing properties of the container when being closed with a cork stopper.

Preferably, the helical guide comprises at least one helical slot made in the outside surface of the base of the plunger or in an internal surface of the guide body and at least one pin solidly connected to the guide body or to the base of the plunger. Said pin is engaged and slides in said helical slot to transform the linear movement effected by the linear actuator into said roto-translational motion of the plunger.

This type of construction is relatively simple and therefore reliable. With this type of construction it is facilitated to apply the invention with already used equipment without necessitating a replacement of the blank mold or the addition of exceedingly other components to the production line.

Preferably, said at least one helical slot winds around said longitudinal axis over an azimuth angle $\gamma_2$ equal to or greater than said predefined azimuth angle $\gamma_1$ of the at least one helical rib or groove.

Preferably, said at least one helical slot winds around said longitudinal axis over an azimuth angle $\gamma_2$ smaller than 360°, more preferably smaller than 200° and according to a preferred embodiment over an azimuth angle of $\gamma_2=90°+/-30°$.

Further preferably, the helical guide comprises n independently starting helical slots, with n greater than or equal to two, and the n helical slots are staggered angularly by an angle equal to 360° divided by n.

In accordance with the preferred pitch angle $\beta_1$ of the helical ribs or grooves in the plunger mandrel, the at least one helical slot has a constant pitch angle $\beta_2$ between 30° and 50°, preferably a constant pitch angle of $\beta_2=37°+/-5°$.

With the afore-mentioned method and equipment a glass container, specifically a bottle, is producible which is provided with a neck with approximately cylindrical form suitable for plugging the container with a stopper inserted in said neck. Said neck has an internal thread for reversible plugging and unplugging of the container by unscrewing and screwing of said compressible stopper, respectively. With the method and equipment of the present invention in particular a wine or spirit bottle can be produced which has a neck with an internal thread comprising two or more independent thread turns imprinted by the ribs or grooves on the outside surface of the mandrel and having a constant pitch angle $\beta$ of between 30° and 50°, while the method and fabrication equipment is not necessarily limited hereto.

Preferably, the thread turns in the container neck wind around the longitudinal axis over an angle of rotation (azimuth angle) $\gamma$ of less than 360°, more preferably between 45° and 200°, and more preferably of $\gamma=90°\pm30°$.

According to a preferred embodiment the ribs or grooves in the plunger mandrel and therewith the thread turns in the container neck extend over a height h3 of between 5 mm and 20 mm along the longitudinal axis.

Preferably the internal thread of the container neck comprises between 3 and 5 independent thread turns.

Further preferably the neck comprises an internal thread-free sealing ring extending from the finish of the container to the beginning of the thread turns made by the thread-free ring below the ribs or grooves on the outside surface of the mandrel. In other words, the thread turns inside the container neck do preferably not extend to the container finish, but have an upper end at a distance of about 2 mm to 5 mm to the container finish.

In accordance with the ribs or grooves on the outside surface of the mandrel, the independent thread turns of the internal thread of the neck are identical and distributed at regular angular intervals over the internal wall of the neck. The independent thread turns of the internal thread have a preferred radial thickness of between 1 and 3 mm.

With such an internal thread, the container has the advantage that it can be plugged and unplugged by simple screwing and unscrewing of a compressible stopper, e.g. a cork stopper, provided with a head suitable to be grabbed by hand and a body suitable for insertion in the threaded neck and conforming during the insertion. This kind of plugging solution seals the container tightly, while providing great ease and practicality of use for the user, who can indefinitely plug and unplug the container by the simple manual operation of screwing and unscrewing the stopper in the neck of the container without to much effort. Furthermore, this kind of plugging solution preserves the high range image of the product held in the container by retaining, for instance, a natural cork stopper with the advantages of a metallic or plastic screw cap.

Other characteristics and advantages of the present invention will become apparent from the exemplary and non-limiting description of a preferred, but not exclusive example of a process and equipment for the fabrication of glass containers provided with internally threaded neck and such glass container, as illustrated in the attached drawings.

DETAILED DESCRIPTION OF THE PREFERRED EMBODIMENTS

In the attached drawings, reference number 1 indicates equipment for mass production of glass bottles provided with an internally threaded neck, for instance equipment of an I.S. machine. An I.S. machine has a plurality of individual sections. Each section may be of single or multiple gob type (typically one, two, three or four gobs per section), wherein the equipment of the shown embodiment will be provided together with each blank mold of the I.S. machine. The illustrated equipment is a "blow-and-blow" type of equipment.

Figure 4:
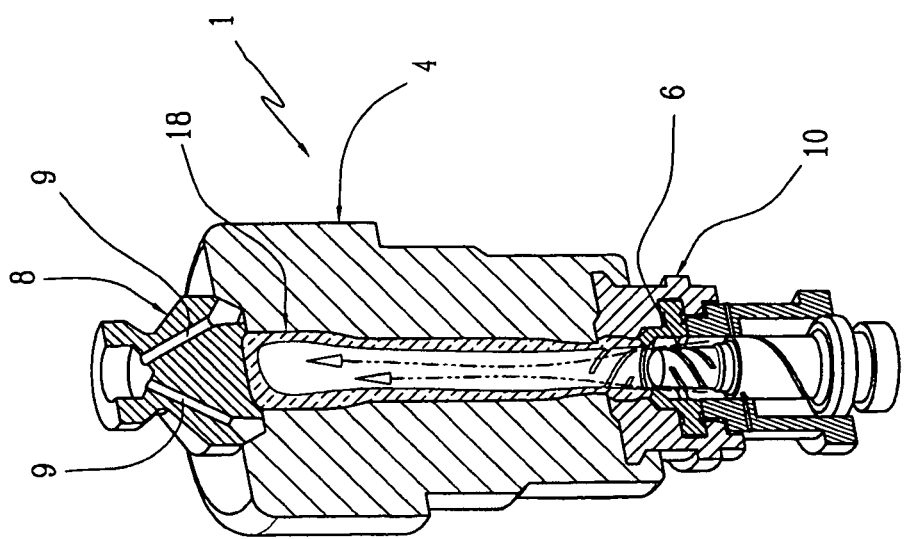

Referring to FIGS. 1 to 4, gobs of molten glass 2 are supplied from a furnace (not shown) by gravity one at the time, through channels 3 to a blank mold 4 or to a battery of blank molds, where each gob is transformed in a preform or parison (FIG. 4). For this purpose, the inside of the blank mold 4 delimits an elongated cylindrical chamber 5 or cavity, which extends along a longitudinal axis X-X and has an upper opening 5a, through which the gob 2 enters, and a lower opening 5b in which a plunger 6 is positioned when the gob is inserted in the chamber.

The equipment 1 further comprises for each blank mold 4, a funnel 7 movable between a first position, in which it is at a distance from the blank mold 4, and a second position, in which it is located on the upper opening 5a. When positioned on the upper opening 5a, the funnel 7 delimits a substantially tapered passage 7a diverging upward. Equipment 1 comprises, for each blank mold 4, a closing body (so-called baffle) 8 provided with internal channels 9, in fluid communication with a not shown compressed air source, leading to an outside surface of baffle 8.

The baffle 8 is movable between a first position, in which it is in contact with funnel 7 when the funnel is located on the upper opening 5a and its internal channels 9 are facing the inside of the substantially tapered passage 7a, a second position, in which it is at a distance from the blank mold 4 and funnel 7, and a third position, in which it is in direct contact with the blank mold 4 and closing the upper opening 5a while its internal channels 9 are closed by the blank mold 4.

The blank mold 4 is mounted on a neck ring 10 which has a central passage opening 11 and forms the outside surface of the bottle neck. When the blank mold 4 is mounted on the neck ring 10, the passage opening 11 extends continuously from the lower opening 5b of the elongated cylindrical chamber 5 to the plunger 6.

The plunger 6 is arranged inside the passage opening 11 of neck ring 10 (FIGS. 1 and 2) and is movable along the longitudinal axis X-X.

Figure 7A:
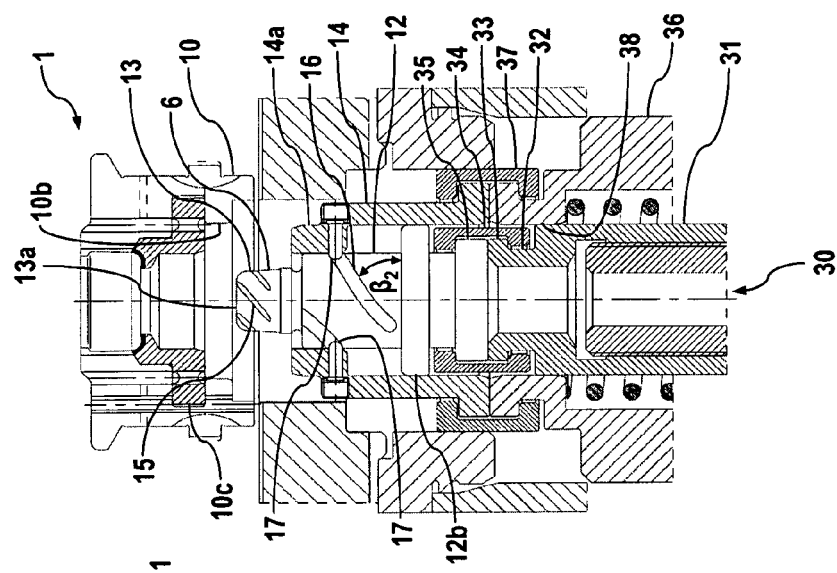
FIGS. 7a to 7c show enlarged views of the equipment in successive phases of the plunger extraction from the blank mold, wherein the plunger having a different helical geometry than the plunger as shown in FIGS. 1 to 4.
Figure 7B:
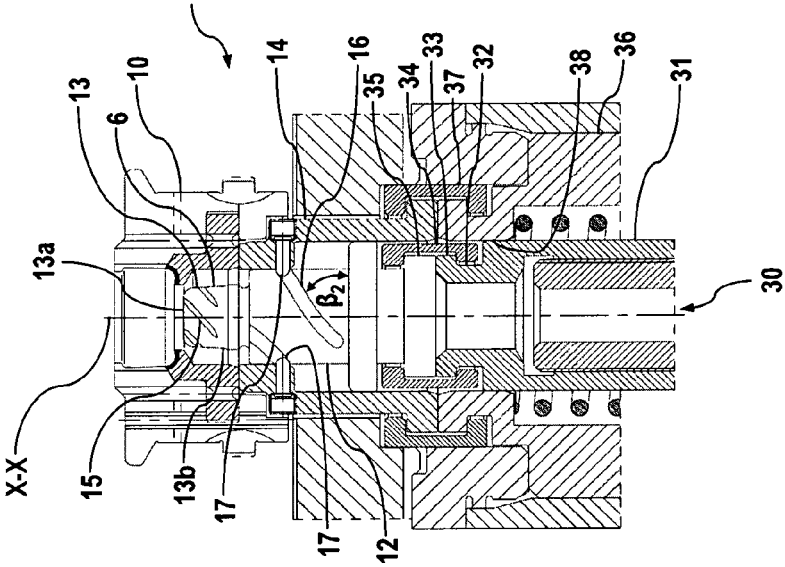

Referring to FIGS. 7a and 7b, the plunger 6 has a base 12 and a work portion 13 forming a mandrel. The work portion 13 has the shape of a tap with an external surface "Se" complementary to the internal surface "Si" of the mouth "M" of the bottle to be produced. The work portion 13 extends from the base 12 into the neck ring 10 and delimits the passage opening 11 of the neck ring 10, when the plunger 6 is in the upper first position. The plunger 6 is inserted in a tubular shaped thimble 14 forming a guide body which is coaxially engaged with the neck ring 10 when the gob is inserted (FIG. 7a) and when the parison is formed (FIG. 7b). For this, the thimble 14 has an upper head portion 14a with smaller diameter engaging a corresponding enlarged annular receptacle 10b of the neck ring 10. In this exemplary embodiment, the neck ring 10 includes a one-piece annular guide ring 10c forming the finish of the container to be produced, wherein the upper head portion 14a of the thimble 14 engages the one-piece annular guide ring 10c. The neck ring 10—with its one-piece annular guide ring 10c—further coaxially guides the upper part of the plunger base 12, when the plunger 6 is in the first position. The plunger 6 slides and is longitudinally guided in the annular thimble 14 by an enlarged guide portion 12b of the base 12. A linear actuator 30 comprising a pneumatic piston (not shown) and a driving rod or piston rod 31 coaxially arranged with the plunger 6 effect a linear movement of the plunger 6 (from the linear actuator 30 only the upper portion of the piston rod 31 is shown). The piston rod 31 acts upon a base flange 35 of base 12 to displace the plunger 6 along the longitudinal axis X-X between the upper first position and the lower second position.

The piston rod 31 terminates in an upper piston head 32 with head flange 33. The head flange 33 is connected by a clamp 34 with the base flange 35 of base 12. The thimble 14 is mounted on the upper end of a plunger sleeve 36 by a sleeve clamp 37. The clamp 34 is in the form of a split ring and the plunger sleeve 36 together with the thimble 14 form a cylindrical tubing 38 in which the split ring 34 is longitudinally slidingly guided and being held together by the plunger sleeve 36 and the thimble 14.

Figure 1:
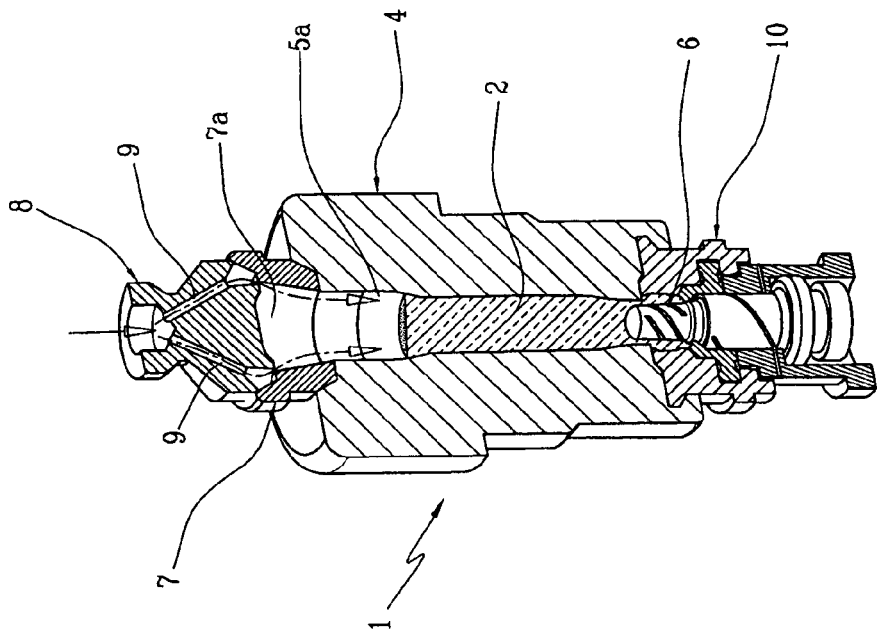
FIGS. 1 to 4 show in schematic section a part of the equipment for forming the parison from a gob of molten glass in successive phases of the process according to the present invention.
Figure 2:
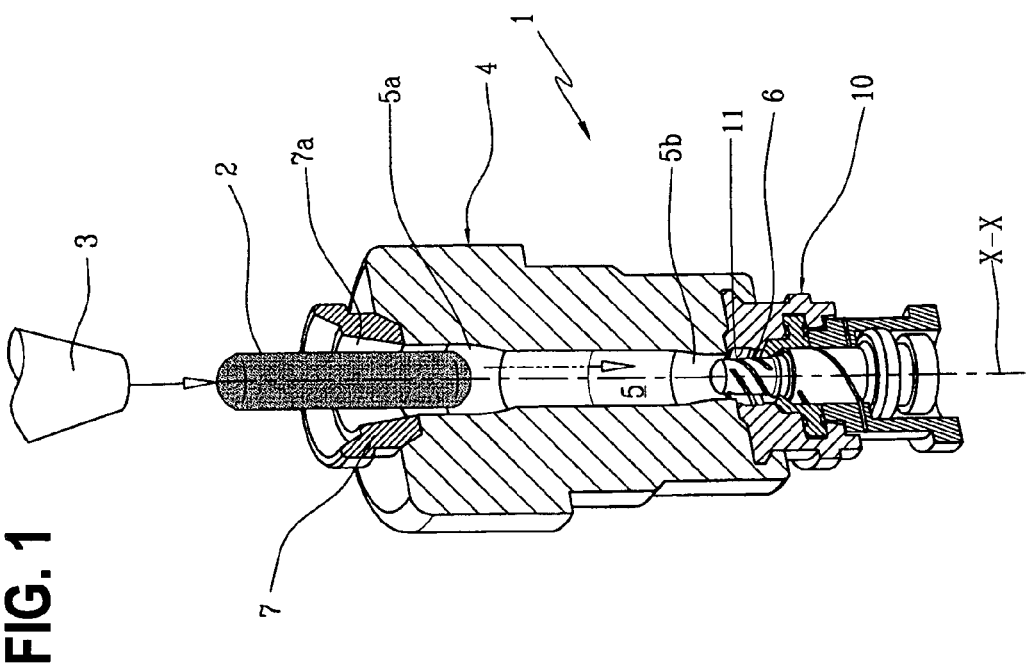

In the upper first position, illustrated in FIGS. 1, 2, 7a, the work portion 13 is completely inserted in the passage opening 11 and also partially in the lower opening 5b and closes the lower mouth of said passage opening 11, in order to delimit a substantially tubular volume, in negative, corresponding to the mouth and the neck of the bottle to be produced.

Figure 3:
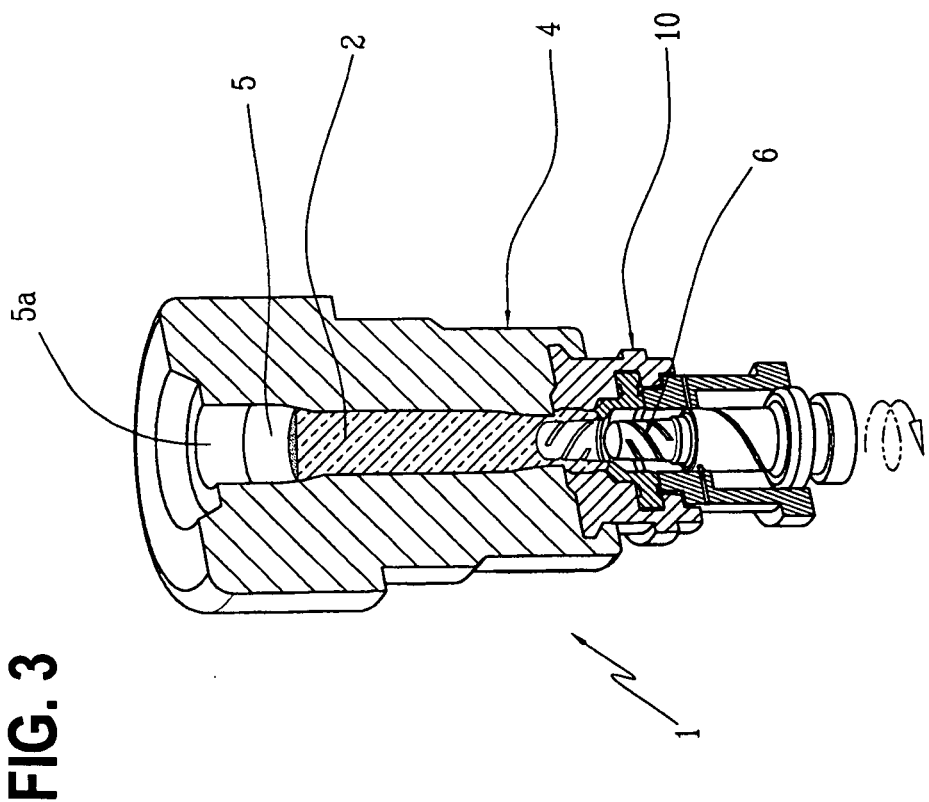

In the second position, illustrated in FIGS. 3, 4 and 7b, the work portion 13 is in lowered position relative to the upper first position and is outside the passage opening 11. The lower mouth of the passage opening 11 is no longer closed by the work portion 13 and is in fluid communication with a source of compressed air (not shown) to blow the gob 2 to a parison 18 in the so-called counter blow step.

Figure 8:
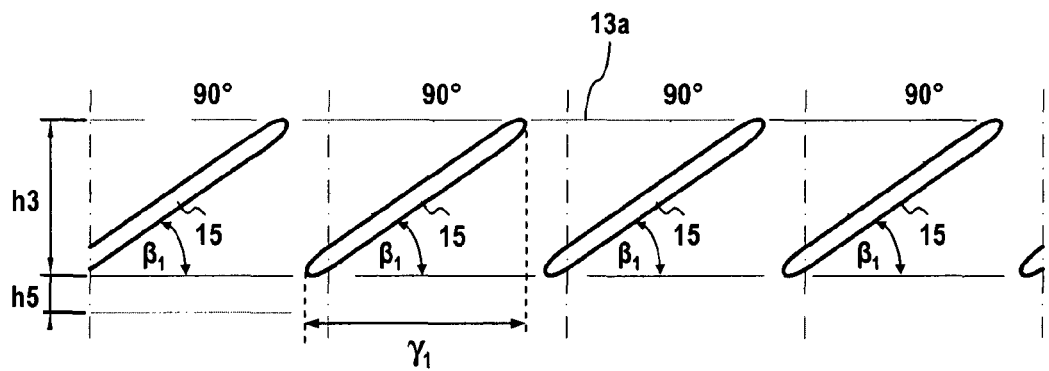
FIG. 8 shows a plan view of the external surface of the unrolled surface of the work portion of the plunger as shown in FIGS. 7a to 7c.

FIG. 8 shows the unrolled outside surface of the work portion 13, which comprises "m" helical grooves 15, which extend to the upper end 13a of the work portion 13. In the illustrated exemplary embodiment there are four helical grooves 15. Each of the grooves 15 winds only partially around the longitudinal axis X-X over a predefined azimuth angle $\gamma_1$ of approximately 90°, measured in a plane perpendicular to the longitudinal axis X-X. Each helical groove 15 is also staggered angularly relative to the preceding and the successive groove 15 by an angle of approximately 90°. In this example the illustrated helical grooves 15 wind around the work portion 13 in clockwise direction. It will be appreciated that they could alternatively wind in counter-clockwise direction, if desired. The pitch angle $\beta_1$ of each groove 15 measured relative to a plane perpendicular to the longitudinal axis X-X is approximately 37°. Each helical groove 15 has a maximum radial depth of approximately 1 mm and a width of approximately 2 mm.

The outside surface of the base 12 comprises n helical slots 16. In the illustrated exemplary embodiment there are two helical slots 16. Each slot 16 winds only partially around the longitudinal axis X-X over an azimuth angle $\gamma_2$ of approximately 180°, measured in a plane perpendicular to the longitudinal axis X-X. Each helical slot 16 is also staggered angularly relative to the other by an angle of 180°, in other words the two slots 16 are opposite to each other. The illustrated helical slots 16 are winding around the base 12 in clockwise direction. The pitch angle $\beta_2$ of each slot 16 is equal to the pitch angle $\beta_1$ of the grooves 15, or approximately 37°. Each helical slot 16 has a radial depth of approximately 2 mm and width of approximately 3 mm.

The thimble 14 comprises a pair of pins 17 solidly attached to the thimble 14. The pins 17 radially project from an inside surface of thimble 14 and are each slidingly engaged in one of the two helical slots 16 of base 12 to form, for the plunger motion, a helical guide coaxial to the longitudinal axis X-X. The coupling between slots 16 and pins 17 forces a rotation of the plunger 6 inside thimble 14 around the longitudinal axis X-X when the plunger is moved longitudinally between the first and second position. In particular, when the plunger is pushed from the second position to the first position inside the blank mold 4, the plunger rotates in clockwise direction. Vice versa, when the plunger 6 is extracted from the blank mold 4 and moves from the first to the second position, it rotates in counter-clockwise direction. Therewith, the plunger 6 carries out a roto-translational motion between the two positions, wherein the angle of rotation of the plunger 6 is equal to or greater than the azimuthal winding angle $\gamma_1$ of each of the helical grooves 15 on the work portion 13.

Figure 7C:
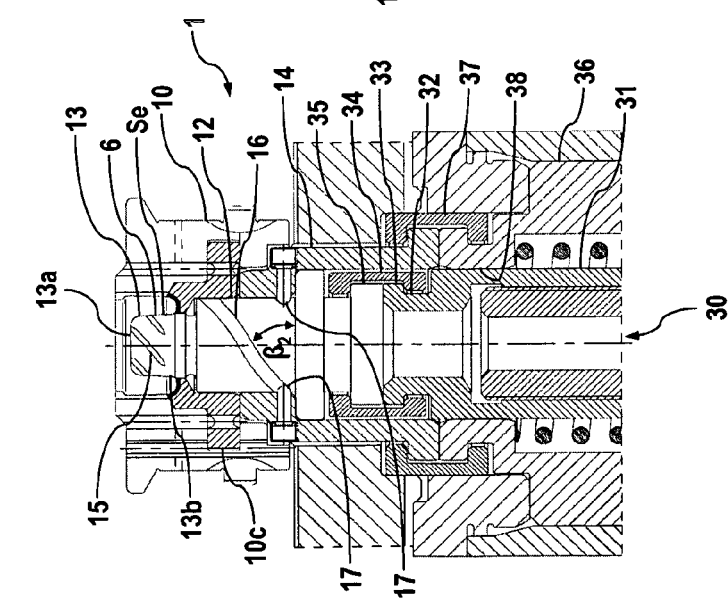

Referring to FIG. 7c the thimble 14 surrounding the plunger 6 is moved down out of engagement with the neck ring 10.

Referring back to FIGS. 1 to 4, when in use, with the funnel 7 located on the upper opening 5a of the blank mold 4 and the baffle 8 separated from the blank mold 4, the plunger 6 is brought to the first position inside the passage opening 11 (FIG. 1). A gob of molten glass 2 falls in the blank mold 4 through the funnel 7 and fills partially the elongated cylindrical chamber 5.

The closing body 8 engages the funnel 7 in the mentioned first position and air is blown through internal channels 9 in the so-called settle blow step. The air pushes the glass downward and fills completely the substantially tubular volume delimited around the work portion 13 and fills also the helical grooves 15 (FIG. 2).

The glass of the mouth and part of the neck of the bottle begin to solidify. At this moment, the plunger 6 is extracted from the mouth bringing it with a roto-translational motion from the first to the second position and leaving on the internal surface of the mouth of the parison helical ribs which form thread turns corresponding to the helical grooves 15 (FIG. 3).

After extraction of the plunger 6, the funnel 7 is removed and the baffle 8 is located directly on the blank mold 4 closing and sealing the upper opening 5a of chamber 5. In the counter blow step, compressed air is introduced in the imprint left by the extracted plunger 6, corresponding to the mouth of the bottle to be formed, provoking the deformation of the glass which fills completely the chamber 5 and forms the preform or parison 18, which is a tubular body closed at the upper extremity (FIG. 4).

Figure 5:
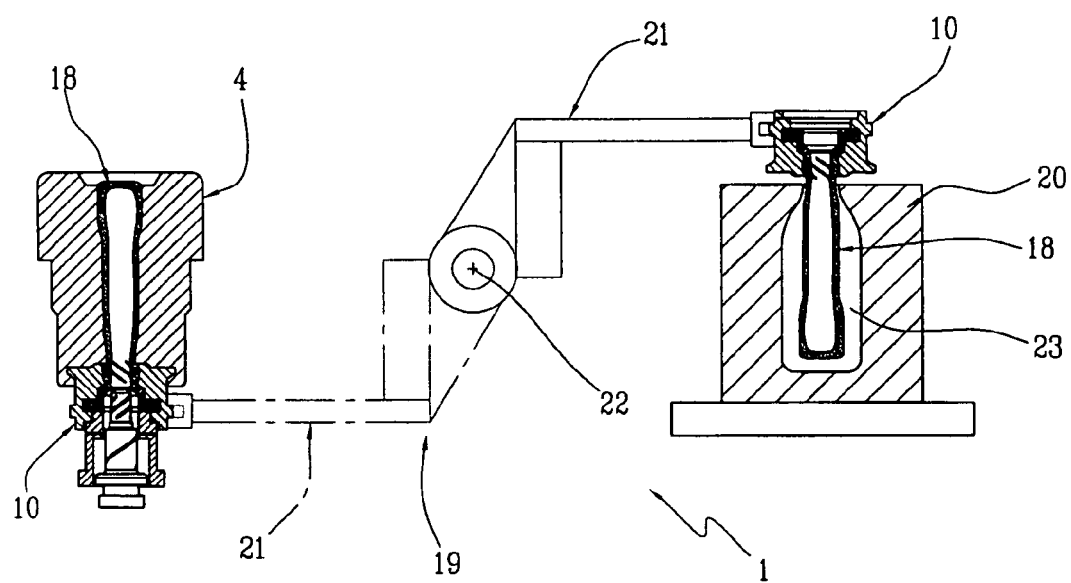
FIG. 5 schematically illustrates the transfer of the parison from the blank mold as shown in FIGS. 1 to 4 to the blow mold.

Referring to FIG. 5, equipment 1 comprises also devices 19 for transferring the parison to a second mold 20. In the illustrated exemplary embodiment, such devices 19 comprise an invert arm 21 with an extremity which is connected to the neck ring 10 and an opposite extremity hinged around a horizontal axis 22. The second mold 20, or blow mold, delimits internally a finishing chamber 23 representing in negative the final dimensions and contour of the bottle to be produced.

The parison 18 is released from the blank mold 4 and turned upside down by means of a 180° rotation of the arm 21 around the horizontal axis 22, and remains suspended by the neck. The blow mold 20 is closed around the parison 18. Through the effect of its own weight, parison 18 is elongated downward inside the finishing chamber 23.

Figure 6:
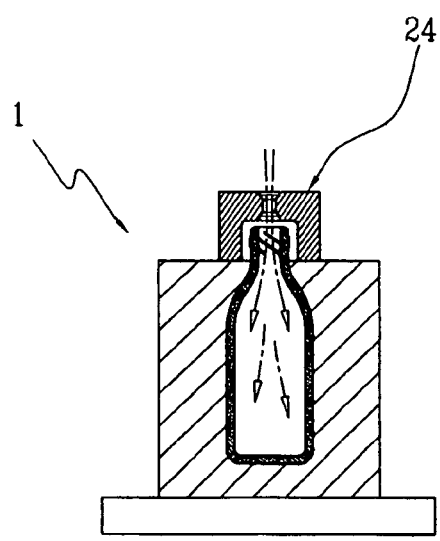
FIG. 6 schematically illustrates blowing of the parison to the final container in the blow mold.

Referring to FIG. 6, at the end of the elongation, a blow head 24 is positioned above the blow mold 20 and begins to blow air in the parison 18, inflating it until it fills the whole finishing chamber 23 (final blow step). The final blow mold opens and pincers, not shown, remove the bottle and transfer it to cooling devices.

Figure 9:
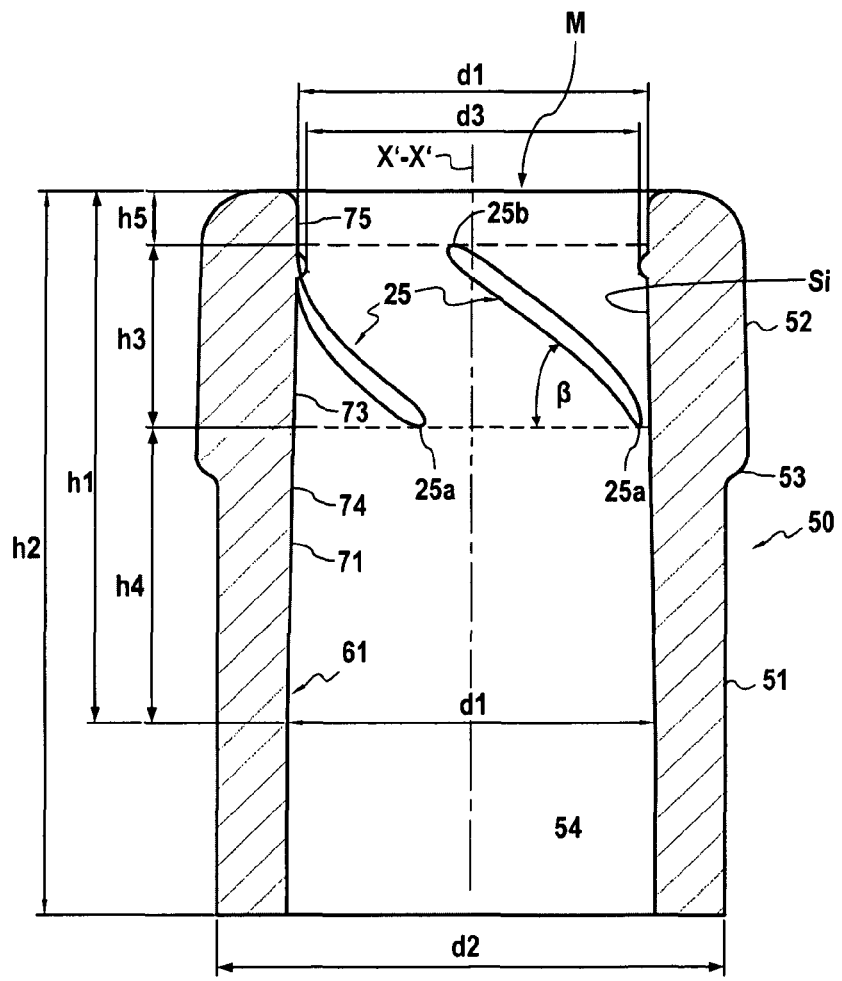
FIG. 9 shows a sectional view of the container produced with the plunger as shown in FIGS. 7a to 7c.

Referring to FIG. 9, the bottle, such as a wine bottle which is produced with the afore-mentioned equipment shown in FIGS. 7a to 7c is described in more detail, in which only the neck of the bottle is shown.

The formed bottle has on its internal surface "Si" of the mouth "M" four helical ribs, which form thread turns 25, corresponding to the grooves 15 of plunger 6. The thread turns 25 extend only partially on the internal surface of the neck of the container.

The neck 50 has a cylindrical throat 51 ending in a head 52, also cylindrical, of slightly larger diameter than the neck, forming a retention shoulder 53 for a metallic or plastic cover for dressing the neck 50 after plugging. Throat 52 and head 53 of neck 50 are coaxial and cylindrical around the longitudinal axis of revolution X'-X' of the container and form an internal tubing 54 of approximately constant diameter over the whole length of neck 50 except in the threaded zones.

The internal thread of the neck 50 is a multiple thread, in this example with four independent thread turns 25 on the internal wall 61 of neck 50 corresponding to the four helical grooves 15 on the work portion 13, at the level of head 52 of neck 50.

More particularly, the internal wall 61 of neck 50 forms from the upper end of the mouth M over a height h1 of at least 30 mm a straight cylindrical section 71, with internal diameter d1 essentially constant over height h1 and by preference equal to 19 mm to 20 mm. By preference, the tolerance applied to this diameter d1 is ±0.5 mm. Within the straight cylindrical section 71 the angle of inclination between the internal wall 61 of neck 50 and the longitudinal axis X'-X' is less than 3°. The diameter d1 is made with such small tolerance by constraining, during the fabrication of the container, the outside diameter d2 of the throat 51 of neck 50 to a value of 27.5 mm measured at height h2 of 40 mm beneath the upper end of the mouth M.

The thread turns 25 of the internal threading of neck 50 are extending in the straight cylindrical section 71, over a height h3 of about 10 mm thereby forming the threaded section 73 of cylindrical form.

The straight cylindrical section 71 extends further from a lower end 25a of the thread turns 25 over a height h4 of about 20 mm (at least 5 mm, and by preference at least 10 mm) and is extending also from the upper end of the mouth M to an upper end 25b of the thread turns 25 over a height h5 of about 3 mm (at least 2 mm and preferably up to 5 mm).

Therewith, above and below the thread turns 25 there are two annular rings in the straight cylindrical section 71 which both have the same inside diameter d1 (except for the tolerances of each of the rings). Therewith, the two annular rings provide two cylindrical thread-free sealing sections 74, 75, where the stopper, when it is screwed in neck 50, is perfectly circumferentially married against the plain internal wall 61 of neck 50 in these sections without disturbance of the thread turns 25, on both sides (above and beneath) of the thread turns 25. This improves preventing air and liquid from entering and/or exiting the container by passing along the thread turns 25 inside neck 50. The upper thread-free sealing section 75 of height h5 is formed by a thread-free portion 13b of the mandrel between the grooves 15 and the base 12.

The thread turns 25 on the internal wall 61 of neck 50 consist of ribs protruding from the internal wall 61. Advantageously, these thread turns 25 are identical and distributed at regular angular intervals over the internal surface 61 of neck 50.

In other words the thread turns 25 are formed by protruding gadroons on the internal wall 61 of the straight cylindrical section 71 of the neck. In this embodiment, the useful passage diameter d3 between the inner edges of the thread turns 7 is by preference between 18 mm and 19 mm, with a tolerance of ±0.5 mm.

The thread turns 25, forming the internal thread 6 of neck 1, have a pitch angle of β=37°, i.e. an angle of 37° relative to a horizontal section of the neck perpendicular to axis X'-X'.

Furthermore, the preferred embodiment shown in FIG. 9 has four thread turns 25, with one thread turn per angular sector of 90° of the internal cylindrical wall 61 of neck 50. Each thread turn 25 extends around the longitudinal axis X'-X' over an azimuth angle of about γ=90°, wherein generally an azimuth angle γ of between 45° and 180° is applicable. As shown in FIG. 9 the thread turns 25 do not overlap along the direction of the longitudinal axis X'-X' with the next thread turn 25. The use of two or more independent ribs or thread turns 25, and the use of a thread of coarse pitch as defined above, is advantageous for the container. The typical weight of a bottle to be produced by the described process is between 300 and 1000 g.

The manufacturing operation of the parison is fast and does not necessarily slow down the production process of existing equipment. Furthermore, the result is ergonomic for the user. First, it allows very quick screwing and unscrewing of the stopper, if applicable with a single hand movement. Second, the user can combine rotational and linear translational forces on the stopper by her/his hand when screwing in the stopper into the bottle neck, which is particularly ergonomically. When screwing in the stopper with the aid of the heel or palm of the hand, the user has more power compared to only use the fingers.

The invention is not limited to the described and shown examples because various modifications can be made without exceeding the scope of the claims. Every feature may individually define an essential feature of the invention, irrespective of whether disclosed in the description, the claims or the drawings, even if disclosed only together with other features.

The invention claimed is:

1. Equipment for the fabrication of glass containers provided with an internally threaded neck, comprising:

a first mold internally delimiting a chamber;
a plunger movable between a first position, in which the plunger extends inside the chamber delimiting, in negative, a volume corresponding to a mouth of a container to be produced, and a second position, in which the plunger is extracted from said chamber, wherein the plunger has at least one helical rib or groove on its outside surface and the movement between said first and second position is a roto-translational motion to unscrew the plunger from a glass portion corresponding to the mouth of the container to be produced;
a linear actuator acting on the plunger, thereby effecting a linear movement of the plunger along a longitudinal axis between said first position and said second position;
a guide body wherein the plunger is movable relative to the guide body along said longitudinal axis; and
a helical guide coaxial to the longitudinal axis and being provided between said guide body and said plunger to transform said linear movement effected by said linear actuator on said plunger into said roto-translational motion of said plunger between said first and second position.

2. Equipment according to claim 1, wherein said at least one helical rib or groove winds around said longitudinal axis over a predefined angle smaller than 360°.

3. Equipment according to claim 1, wherein the plunger has m helical ribs or grooves forming a multiple internal thread in the container neck consisting of m independently starting thread turns, wherein m is greater than or equal to two.

4. Equipment according to 1, wherein said at least one helical rib or groove on the outside of the plunger which imprints the internal thread in the glass portion corresponding to the mouth of the container to be produced.

5. Equipment according to claim 1, wherein said at least one helical rib or groove has a pitch angle of between 30° and 50°.

6. Equipment according to claim 1, wherein the plunger comprises i) a work portion having on its outside surface said at least one helical rib or groove forming said internal thread in the container neck and ii) a base from which the work portion extends, and wherein said work portion has a thread-free ring below the at least one helical rib or groove to form a thread-free portion of the container mouth adjacent to the finish of the container.

7. Equipment according to claim 1, wherein said helical guide comprises n helical slots, with n greater than or equal to two, and the n helical slots are staggered angularly by an angle equal to 360° divided by n.

8. Equipment according to claim 1, wherein said plunger has a base and wherein said linear actuator comprises a driving rod to act upon the plunger base to displace the plunger along the longitudinal axis.

9. Equipment according to claim 8, wherein the plunger carries out the roto-translational motion, while the driving rod linearly moves without rotational motion.

10. Equipment according to claim 9, wherein the plunger base and the driving rod are slidingly engaged with each other to allow for relative rotation between the driving rod and the plunger base.

11. Equipment according to claim 1, wherein said linear actuator acts directly on said plunger.

12. Equipment according to claim 1, wherein said linear actuator linearly moves said plunger along said longitudinal axis so that said helical guide transforms said linear movement effected by said linear actuator on said plunger into said roto-translational motion of said plunger between said first and second position.

13. Equipment according to claim 1, wherein said helical guide includes a plurality of helical slots in said guide body or in said plunger.

14. Equipment for the fabrication of glass containers provided with an internally threaded neck, comprising:
- a first mold internally delimiting a chamber;
- a plunger movable between a first position, in which the plunger extends inside the chamber delimiting, in negative, a volume corresponding to a mouth of a container to be produced, and a second position, in which the plunger is extracted from said chamber, wherein the plunger has at least one helical rib or groove on its outside surface and the movement between said first and second position is a roto-translational motion to unscrew the plunger from a glass portion corresponding to the mouth of the container to be produced;
- a linear actuator acting on the plunger, thereby effecting a linear movement of the plunger along a longitudinal axis between said first position and said second position;
- a guide body wherein the plunger is movable relative to the guide body along said longitudinal axis; and
- a helical guide coaxial to the longitudinal axis and being provided between said guide body and said plunger to transform said linear movement effected by said linear actuator on said plunger into said roto-translational motion of said plunger between said first and second position,
- wherein the plunger has a base,
- wherein said linear actuator comprises a driving rod movable coaxially with said longitudinal axis, and
- wherein said driving rod has a terminating head portion being longitudinally fixedly connected to said base.

15. Equipment according to claim 14, wherein said terminating head portion of said driving rod has an upper flange and said base of said plunger has a lower flange and wherein said terminating head portion and said base are connected by a clamp which engages said upper and lower flange, and wherein said clamp connection allows for rotation of said base relative to said driving rod.

16. Equipment according to claim 14, wherein said plunger has a work portion with said at least one helical rib or groove on its outside surface forming said internal thread in the container neck and wherein said linear actuator further comprises a pneumatic or hydraulic piston drive or a servo-electric drive.

17. Equipment for the fabrication of glass containers provided with an internally threaded neck, comprising:
- a first mold internally delimiting a chamber;
- a plunger movable between a first position, in which the plunger extends inside the chamber delimiting, in negative, a volume corresponding to a mouth of a container to be produced, and a second position, in which the plunger is extracted from said chamber, wherein the plunger has at least one helical rib or groove on its outside surface and the movement between said first and second position is a roto-translational motion to unscrew the plunger from a glass portion corresponding to the mouth of the container to be produced;
- a linear actuator acting on the plunger, thereby effecting a linear movement of the plunger along a longitudinal axis between said first position and said second position;
- a guide body wherein the plunger is movable relative to the guide body along said longitudinal axis; and
- a helical guide coaxial to the longitudinal axis and being provided between said guide body and said plunger to transform said linear movement effected by said linear actuator on said plunger into said roto-translational motion of said plunger between said first and second position,
- wherein the plunger comprises i) a work portion having on its outside surface said at least one helical rib or groove forming said internal thread in the container neck and ii) a base from which the work portion extends, wherein said helical guide comprises at least one helical slot made in said base or on an internal surface of the guide body and at least one pin solidly connected with the guide body or with the base of the plunger, wherein said pin is slidingly engaged in said helical slot to transform said linear movement into said roto-translational motion.

18. Equipment according to claim 17, wherein said at least one helical slot has a pitch angle of between 30° and 50°.

19. Equipment according to claim 17, wherein said at least one helical slot winds around said longitudinal axis over an angle equal to or greater than said predefined angle of said at least one helical rib or groove.

20. Equipment according to claim 17, wherein said at least one helical slot winds around said longitudinal axis over an angle smaller than 360°.

* * * * *